G. F. PICKETT.
TOOL HOLDER.
APPLICATION FILED JULY 2, 1920.
1,406,220.
Patented Feb. 14, 1922.
2 SHEETS—SHEET 1.
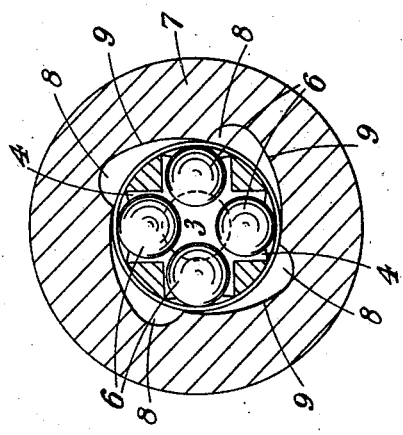
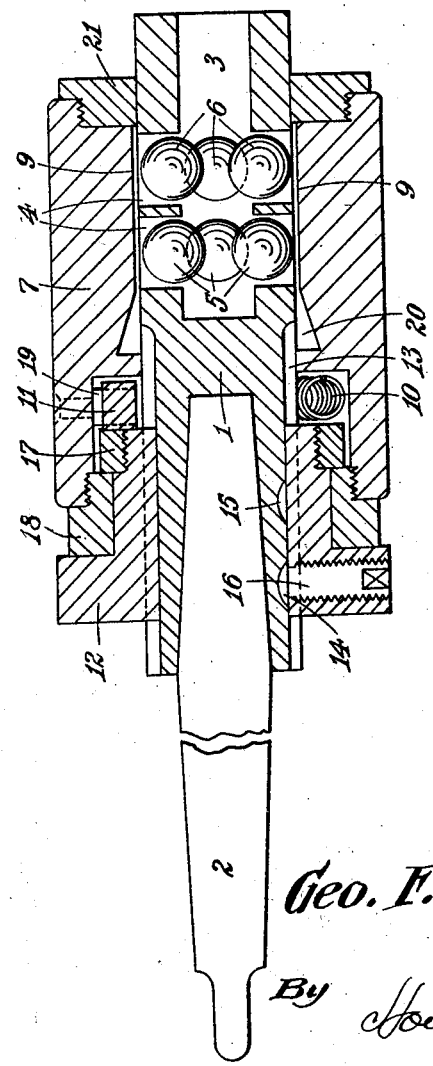
Inventor.
Geo. F. Pickett
By Howard A. Coonts.
Attorney

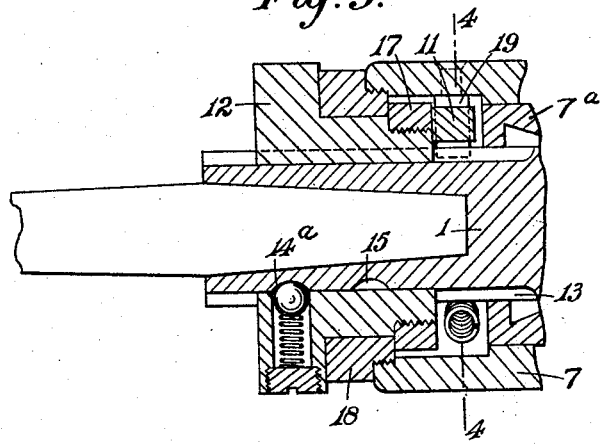
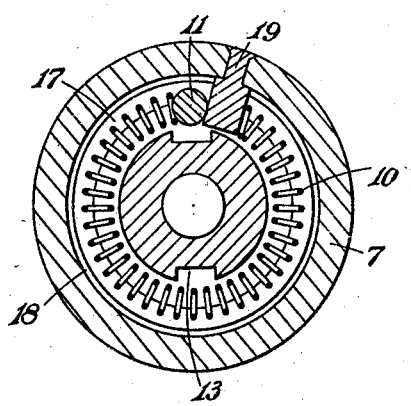

UNITED STATES PATENT OFFICE.

GEORGE FREDERICK PICKETT, OF LONDON, ENGLAND.

TOOL HOLDER.

1,406,220.  Specification of Letters Patent. Patented Feb. 14, 1922.

Application filed July 2, 1920. Serial No. 393,732.

*To all whom it may concern:*

Be it known that I, GEORGE FREDERICK PICKETT, a subject of the King of Great Britain and Ireland, residing at London, England, have invented an Improved Tool Holder, of which the following is a specification.

This invention relates to an improved tool holder or chuck suitable for drills, taps and so forth, employed on drilling or other rotary machines, of the quick release type in which internal cams co-operate with balls forming the gripping elements.

This invention is distinguished from the prior art in that a rigid grip of the tool can be produced, or alternatively a self-aligning or floating grip can be produced by rendering certain of the balls or gripping elements inoperative.

This invention, contemplates broadly, a tool holder having in combination means for producing a rigid grip with means for producing a floating or self-aligning grip. More specifically stated a tool holder according to this invention comprises the combination with a plurality of tool gripping devices or elements of means whereby a rigid grip is produced, means whereby a floating grip is produced and means whereby the tool is quickly locked and released. Further features will transpire in the following description of the accompanying drawings, in which:—

Figure 1 is a vertical longitudinal section of the holder or chuck.

Figure 2 is a vertical cross section thereof.

Fig. 3 is a partial view similar to Fig. 1 showing a slightly modified construction, and Fig. 4 is a cross section on line 4—4 of Fig. 3.

Referring to the drawings the body portion 1 is fitted with a shank 2 and is bored out at 3 to receive a drill or other tool. Holes 4 are provided to accommodate two rings of hardened steel balls 5 and 6 respectively. The sleeve 7 embracing the body portion is recessed at 8 so as to form cam surfaces at 9 which engage the balls 5 and 6 under the influence of a garter spring 10 engaging at one end the stud 11 carried by a collar 12 and at the other end a stud 19 carried by the sleeve. The stud 11 acts as a stop to prevent sleeve 7 being rotated too far on the body 1.

Collar 12 is keyed to the body so as to slide thereon in the keyways 13. Recesses 14 and 15 are provided in the body portion and a set screw or catch 16 in collar 12 engages one or other of the recesses as the collar and sleeve are moved axially of the holder in one direction or the other. A ring 17 screwed on collar 12 retains the securing ring 18, which is free to rotate on the collar, in place. Ring 18 serves for screwing the collar into or out of the sleeve. The bore of sleeve 7 is counter-bored or enlarged at 20 and a guide ring 21, sliding on the body portion, is screwed into the sleeve.

The operation is as follows. By rotating sleeve 7 with respect to body portion 1 against the action of spring 10 until recesses 8 are opposite the balls, a drill can be inserted whereupon the balls move radially outwards. Upon releasing the sleeve spring 10 forces it round and causes the cam surfaces 9 to engage the balls and thus lock the tool in a rigid grip. In this position catch 16 engages recess 14. By sliding the collar and sleeve on the body until the counter-bore 20 is opposite the balls 5 the latter release their grip on the tool. In this position the tool is gripped by balls 6 only that is to say in a floating or self-aligning grip.

The arrangement above described is such that a tool can be inserted or removed and the grip converted from rigid to floating practically instantly. By using a spring catch as shown at 14ª in Fig. 3 in place of the set screw 16, and merely pulling the sleeve towards the tool the rigid grip is converted to the floating grip and vice versa. These operations can be performed while the machine is running and thereby much time in manipulation is saved.

Another advantage of this invention is that a single holder will accommodate equally well tools of different sizes that is to say of different shank diameters and two or three such holders or chucks each having balls of different diameters are sufficient to hold a wide range in size of tools.

Although one form of construction has been described the invention is not necessarily limited thereto but may be carried out in various ways without departing from the ambit of the claims. For instance, the sleeve may be fitted with a liner 7ª, as shown in Fig. 3, consisting of hardened steel and having the cams and grooves formed therein.

What I claim is:—

1. In a tool holder means for converting the grip into a rigid or floating grip, comprising in combination a body portion, a plurality of tool gripping elements therein, a sleeve rotatable about and longitudinally movable upon said body portion and cam grooves in said sleeve co-operating with said gripping elements to produce a rigid grip in one longitudinal position and a floating grip in another longitudinal position of said sleeve and to release the grip when said sleeve is rotated in one direction.

2. In a tool holder the combination with a body portion having a shank thereon and a bore therein of two rings of balls mounted in said body a sleeve embracing said body, means whereby said sleeve normally engages both rings of balls to produce a rigid grip, means whereby one ring of balls is rendered inoperative to produce a floating grip and means whereby both rings of balls are rendered inoperative to insert or release the tool.

3. In a tool holder the combination with a body portion having a shank thereon and a bore therein of two rings of balls mounted in said body, a sleeve embracing said body, cams and grooves in said sleeve co-operating with said rings of balls, a spring normally urging said sleeve into the locking position means for adjusting the position of the sleeve longitudinally whereby one ring of balls is rendered inoperative and means for retaining said sleeve in a predetermined position on said body.

4. In a tool holder the combination with a body portion having a shank thereon and a bore therein of two rings of balls mounted in said body, a collar longitudinally adjustable on said body, means for retaining said collar in one of two predetermined positions, a sleeve embracing said body and revolubly mounted on said collar, a guide ring carried by said sleeve and engaging said body, a stop on said collar, a stop on said sleeve, a spring co-acting with said stops to normally urge the sleeve into the locking position and cams and grooves in said sleeve co-acting with said rings of balls to produce in one longitudinal position a rigid grip and in another longitudinal position a floating grip and when rotated to release the tool.

5. In a tool holder the combination with a body portion of a shank thereon, a bore therein, holes in the hollow end and keyways in the solid end of said body, a sliding collar keyed to the solid end, a revoluble screw-threaded ring mounted on said collar, a retaining ring for said revoluble ring, a stop on said collar, a catch in said collar engaging notches in said body, a sleeve screwed to said revoluble ring, a stop within said sleeve a guide ring screwed to said sleeve and engaging said body, two rings of balls mounted in the holes in said body, grooves in said sleeve permitting said balls to move radially outwards, cams on said sleeve whereby said balls are forced radially inwards, a counter bore in said sleeve rendering one ring of balls inoperative when said collar and sleeve are displaced longitudinally in one direction and a spring normally urging said sleeve and at least one ring of balls into the locking position.

Signed at London this June, 1920.

GEORGE FREDERICK PICKETT.

In the presence of—
 Lois Chasteauneuf,
 Chas. J. Falconer.